Patented Sept. 19, 1922.

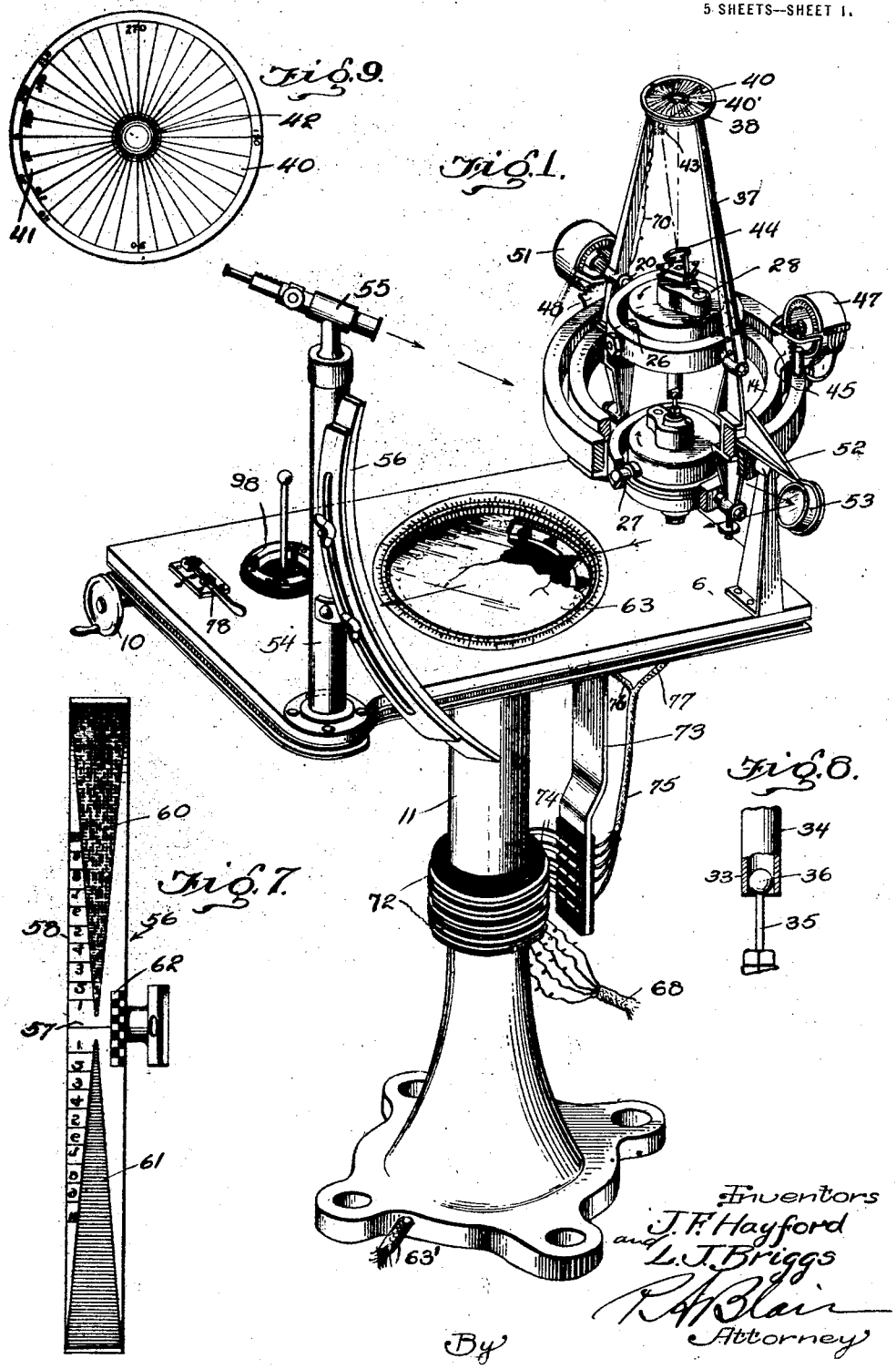

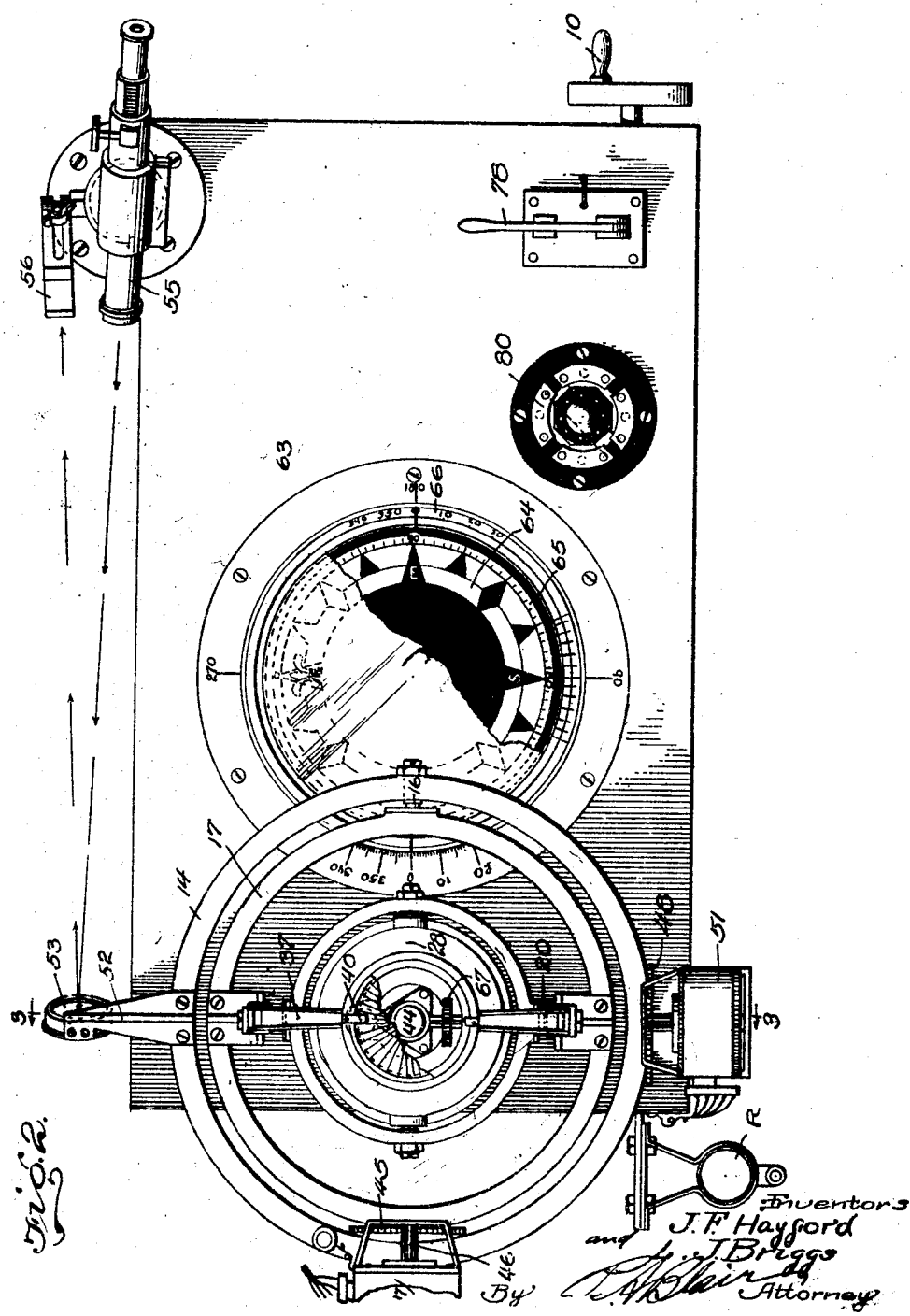

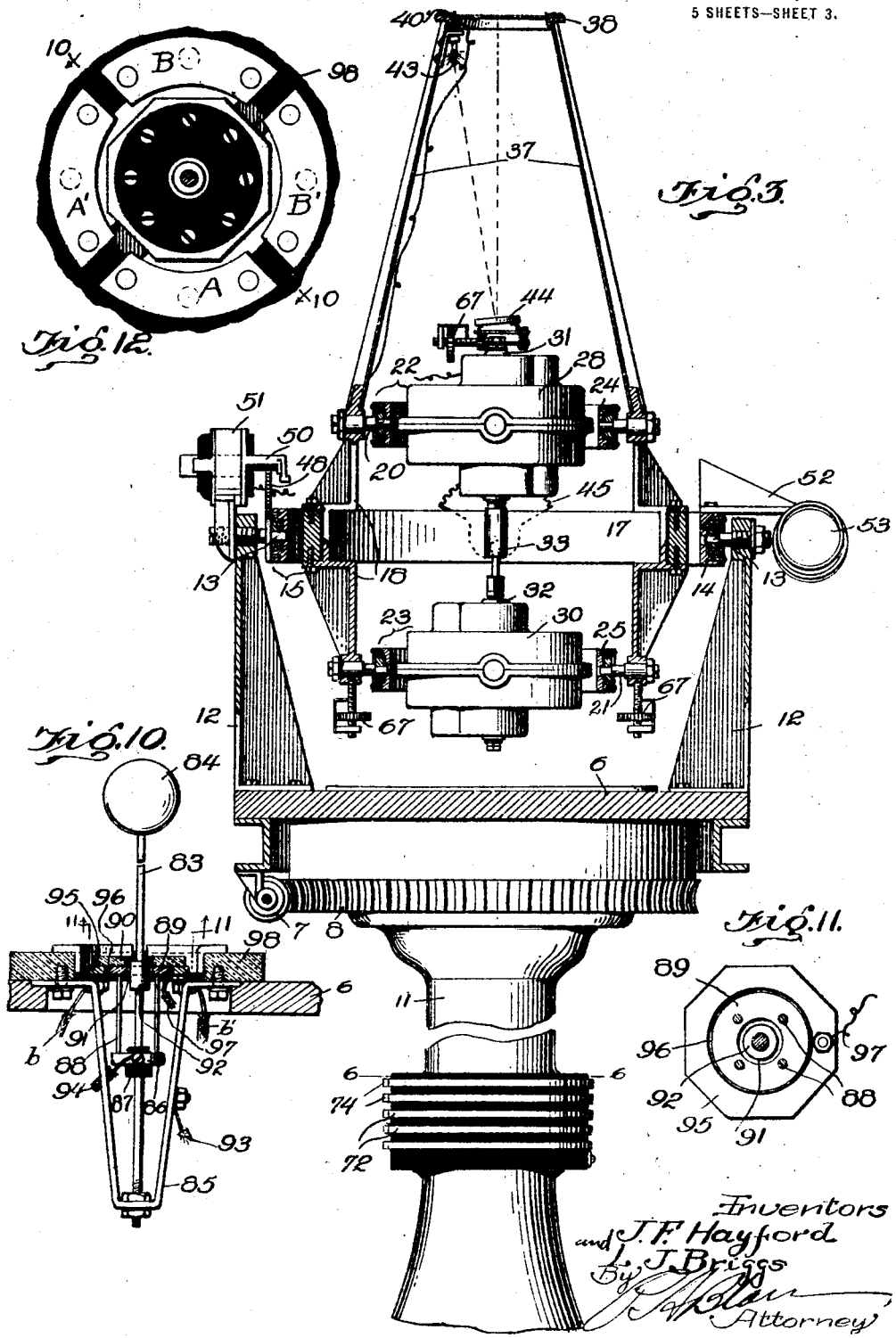

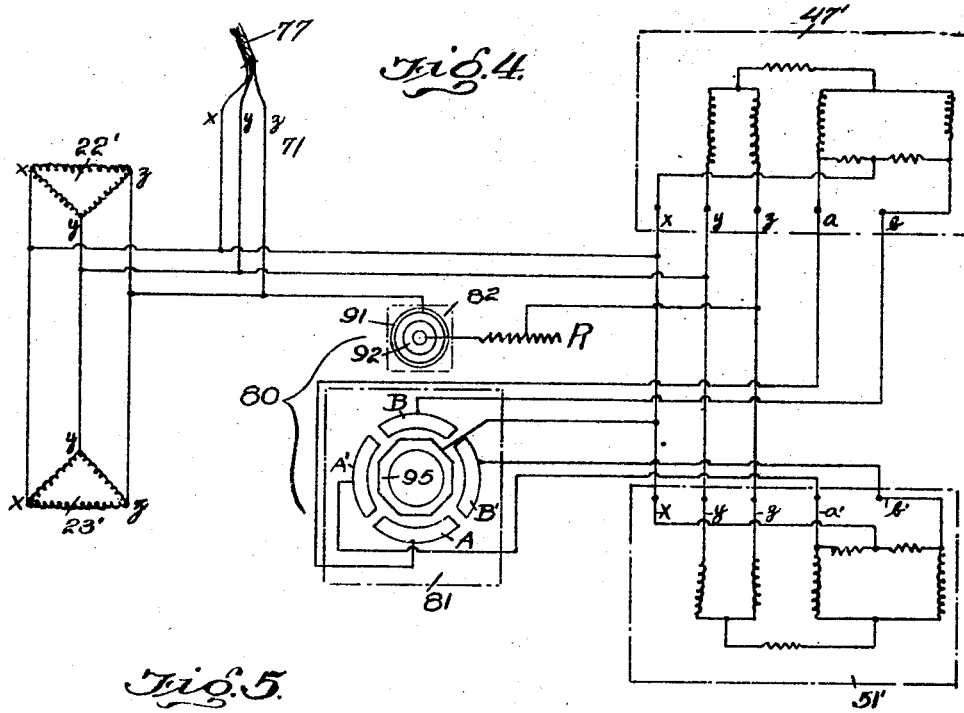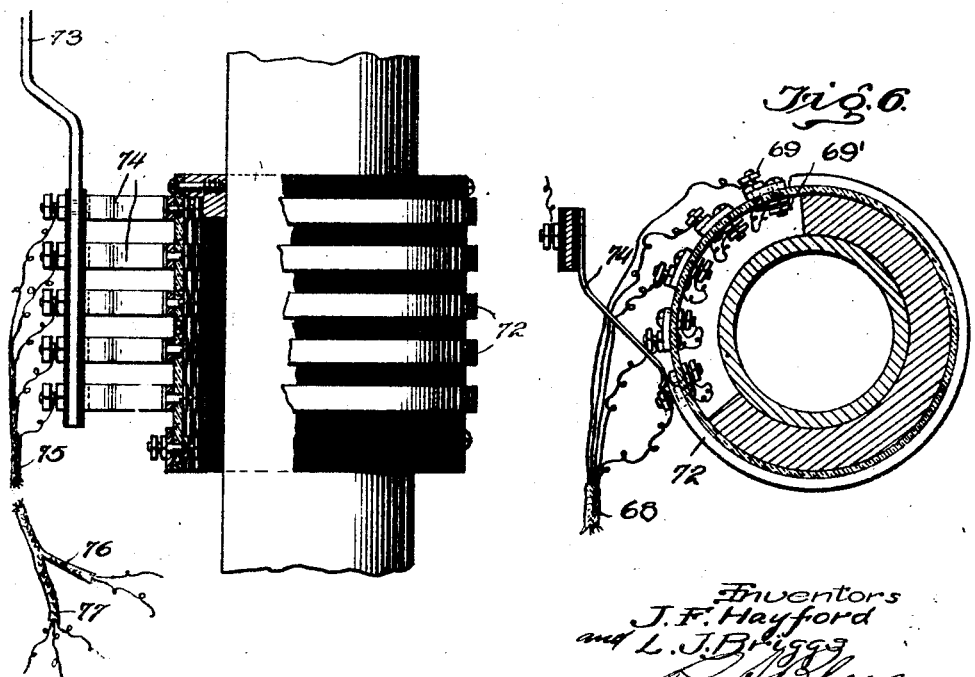

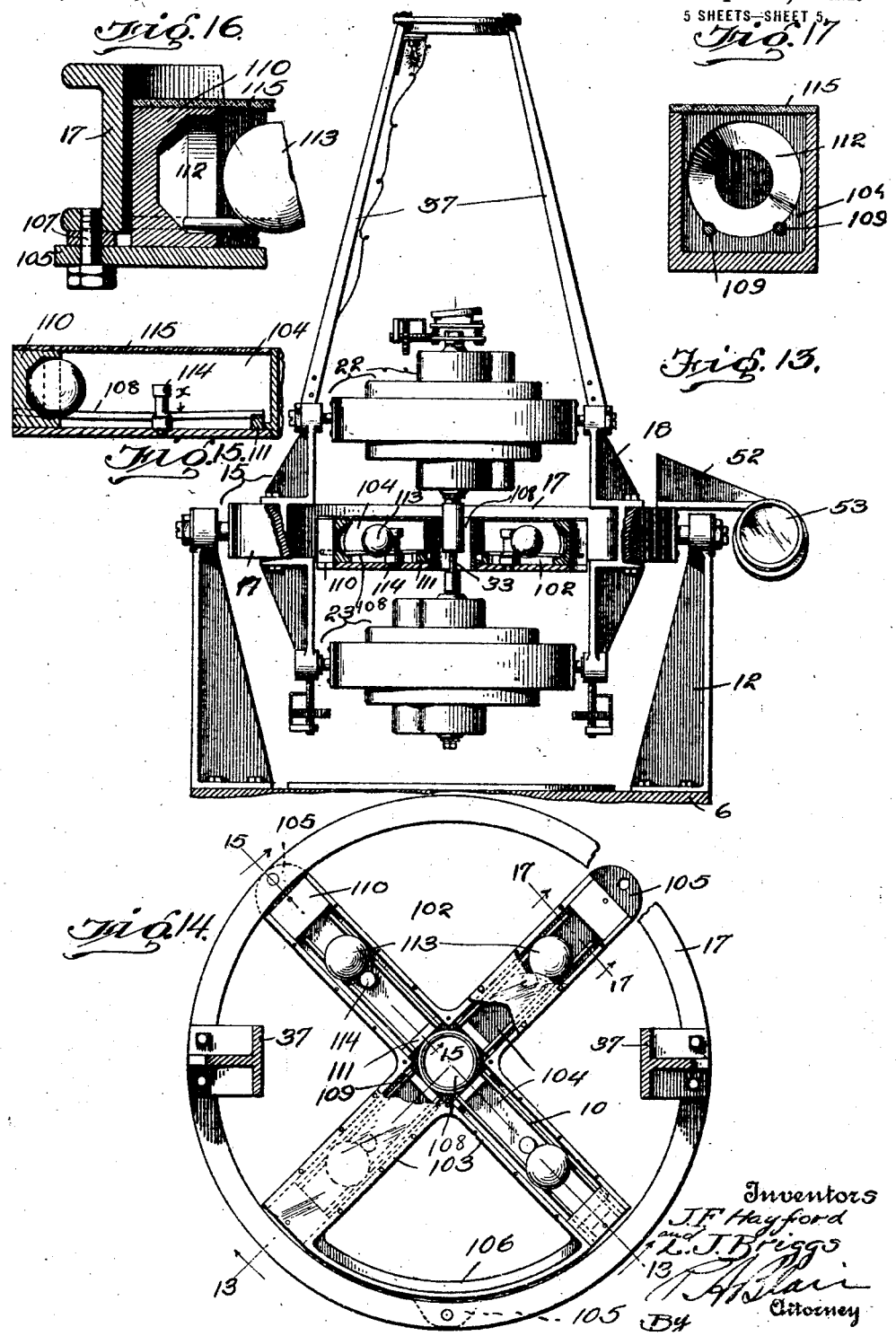

1,429,588

UNITED STATES PATENT OFFICE.

JOHN FILLMORE HAYFORD, OF EVANSTON, ILLINOIS, AND LYMAN JAMES BRIGGS, OF BATTLE CREEK, MICHIGAN, ASSIGNORS TO THE GOVERNMENT OF THE UNITED STATES.

GYROSCOPIC APPARATUS.

Application filed April 17, 1919. Serial No. 290,895.

*To all whom it may concern:*

Be it known that we, JOHN FILLMORE HAYFORD and LYMAN JAMES BRIGGS, citizens of the United States, residing at Evanston, Illinois, and Battle Creek, Michigan, respectively, have invented new and useful Improvements in Gyroscopic Apparatus, of which the following is a specification.

The present invention concerns a device adapted to provide a horizontal reference plane or artificial horizon which is constantly maintained in position in spite of the movements and disturbing forces to which the body on which the device is mounted subjects the device.

The constantly maintained reference plane thus provided may be utilized in determining the geographic position of a ship or aircraft, in bombing from aircraft, or in measuring the inclination to the horizon of any part of an aircraft or, in general, in any case in which it is important to maintain a true vertical line or a true horizontal plane with considerable accuracy in a moving vehicle. Thus, while the invention will be hereinafter described for use in connection with the directing and firing of the guns on a warship it is to be understood that this specific application is only by way of illustration of the broad idea herein involved, which may equally well be applied to other and various uses than those above mentioned.

In considering the application of this device for use aboard a battleship or other war vessel in establishing an artificial horizon which takes the place of the natural visible horizon in fixing the angle of the guns at the moment of firing, it must be understood that weather conditions and battle conditions often make it difficult and at times impossible aboard ship to obtain observations on the horizon so that under these conditions, accurate firing of guns at a distant object becomes very difficult or even impossible.

In attempting to provide a means to overcome this disadvantage we have, in the specific application shown in the drawings, resorted to a system composed of two electrically driven gyroscopes mounted in two independent gimbal systems, one gyroscope above the other and rotating in opposite directions with their axes in the same vertical line and connected by a ball and cylinder joint located in the prolongation of their axes, with two gimbal systems containing the gyros supported by the inner gimbal ring of a common outer independent gimbal system, with the center of gravity of each gyro and its gimbal system slightly below the center of motion of that system, and with the center of gravity of the whole system slightly below the center of motion of the outer gimbal system.

Generally speaking, this gyroscope arrangement will be effective to maintain the inner gimbal ring of the outer gimbal system very nearly in a horizontal plane in spite of disturbing forces of moderate size while automatic or manually operated means may be provided, capable of applying torque to the gimbal rings of the outer gimbal system to correct for displacements caused by any unusually large disturbing forces. If the system is so disposed that the two bearings of the inner gimbal ring of the outer gimbal system lie in the line of sight to be actual target, then, since these bearings always remain at very nearly the same level, the outer gimbal ring will only have such relative movement with respect to the support in which it is journaled as is caused by those components of the pitch and roll of the vessel which are parallel to the vertical plane containing the line of sight to the target. This relative movement is reproduced by a suitable means on an indicating device and serves as a means for indicating when the guns of the vessel are in a firing position. It should be noted that the vessel moves around the apparatus while the inner gimbal ring and one line on the outer gimbal ring remain practically stationary in as far as angular motion is concerned.

Proceeding now with the description of the invention as disclosed in the drawings, and in which like characters of reference indicate the same parts, Figure 1 is a view in perspective of the apparatus, with certain parts shown broken away;

Figure 2 is a top plan view of the same;

Figure 3 is a view taken substantially along the line 3—3 of Figure 2, looking in the direction of the arrows;

Figure 4 is a diagram of the wiring used; and

Figure 5 is a detail view showing the contact rings and contact fingers carried by the pedestal;

Figure 6 is a transverse cross sectional view along the line 6—6 of Figure 3;

Figure 7 is a detail view of the sighting scale;

Figure 8 is a view of the ball and cylinder connecting joint;

Figure 9 is a view of the reference dial;

Figure 10 is a view of the eight-point switch taken along line 10—10 of Figure 12;

Figure 11 is a view of the switch taken along line 11—11 of Figure 10, looking in the direction of the arrows;

Figure 12 is a top plan view of the switch;

Figure 13 is a view similar to Figure 3 showing the weight shifter in section taken substantially along the line 13—13 of Figure 14.

Figure 14 is a top plan view of the weight shifter as applied to the horizon ring with certain parts broken away.

Figure 15 is a cross-sectional view of one of the tracks taken substantially along the line 15—15 of Figure 14 and looking in the direction of the arrows.

Figure 16 is an enlarged detail view in section of one of the tracks and Figure 17 is a transverse cross-sectional view of one of the tracks taken along the line 17—17 of Figure 14 and looking in the direction of the arrows.

The main apparatus is mounted upon a table or support 6, which is rotatable by means of worm 7, gear 8, and hand wheel 10, about a pillar or pedestal 11, secured to some portion of the ship, the axis of which pedestal is parallel to the axes about which the guns rotate in azimuth.

At one end of this table, brackets 12, mounted on opposite sides thereof, provide bearings 13 for on outer gimbal ring 14 of a so-called major gimbal system 15, said outer gimbal ring in turn providing bearings 16, in a plane at right angles to that including its own bearings, for an inner gimbal ring 17. Vertical arms 18 extend in either direction from each side of the inner gimbal ring 17, in a plane including the bearings for an outer gimbal ring 14, and provide bearings 20 and 21 respectively above and below the inner gimbal ring for the outer gimbal rings of the two gyro systems 22 and 23.

Bearings 13, 21 and 22 all include the usual balls and ball races so that friction at these points is reduced to a minimum, and for all practical purposes may be regarded as eliminated.

The upper and lower gyro systems 22 and 23 are similar to each other and include outer gimbal rings 24 and 25 providing bearings at 26 and 27, in a plane at right angles to that including the bearings 20 and 21, for the gyro casings 28 and 30, forming the inner gimbal ring of these gyro systems, and providing bearings at 31 and 32 for the rotors of the two gyros. The axes of such gyro rotors, are so disposed that the plane including them is at right angles to the plane including the axes that are supported in bearings 25, 26 and 20, 21, that is, these axes lie in two mutual right angle planes and form the customary universal mounting for the gyros. The gyros themselves are of well-known electrically driven type, having fields 22' and 23' (see Figure 4) and receive current for operating them in a manner hereinafter to be described. The electrical connections to the gyros are such that the upper gyro 22 rotates counter-clockwise as seen from above, while the lower gyro 23 rotates in a clockwise direction as seen from the same point, the same being indicated by the arrows on the gyro casings in Figure 1.

The two gyros, 22 and 23 are mounted one above the other so that in the absence of disturbing forces their axes are in alignment and the adjacent end of these axes are connected by a ball and cylinder arrangement 33 which is shown more in detail in Figure 8. This connection comprises a hollow cylinder 34 secured to the lower end of the axis of the upper gyro 22 and a stem 35 provided with a ball 36, carried by the upper end of the axis of the lower gyro 23. This ball 36 is adapted to fit within the hollow cylinder 34, which cylinder has an inside radius slightly greater than that of the ball, so that a movement of the adjacent ends of the axes of the two gyros in the same direction will be permitted by this connection, but a movement of the adjacent ends of the axes in opposite directions will be prevented. This insures that the motions of the gyro axes, with reference to the inner ring 17 of the outer gimbal system (known as the horizon ring), shall always be equal and opposite. To state it another way, when a disturbing force causes the top of one gyro to move in one direction and the top of the other gyro to move in the opposite direction, the connection will permit such movement, but it opposes and prevents like motions of the tops of the gyros with reference to the horizon ring 17.

The arms 18, which provide bearings 20 and 21 for the upper and lower gyros, extend on above the upper gyro 22 as at 37, and support at the top a circular frame 38 carrying a reference dial 40, of celluloid or the like (see Figure 9) which is graduated around the circumference as at 41, and is provided with concentric circles of reference 42. Securing clips 40' retain the dial in place. A small electric light 43 secured ● one of the arms 37 beneath the dial 40 and to one side thereof, is adapted to cooperate with a concave mirror 44 mounted on the upper part of the casing of the upper gyro 22 on the prolongation of the axis thereof. Thus the light 43 when reflected from the mirror 44 will appear to an observer looking down upon the dial 40 as a spot, and the various positions of the spot on the dial will be an indication of the position of the plane of rotation of the upper gyro 22 (and likewise of the lower gyro 23, as both gyros move together by reason of connection 33) with respect to a comparative plane through the horizon ring 17, say a plane through the upper side of this ring, which side rests in a horizontal plane when no disturbing forces have affected the position thereof. This is the plane that it is intended to refer to when the expression "plane of the horizon ring" is used.

To one side of the horizon ring 17 and above one of the bearings 16 therefor, is secured a gear segment 45 with which meshes a pinion 46 driven by a small motor 47 mounted on the outer ring, known as the inner impressor motor. Similarly, above one of the bearings 13 for the outer gimbal ring 14 there is mounted a similar gear segment 48 secured to the outer gimbal ring 14, with which meshes a pinion 50 driven by a second motor 51, known as the outer impressor motor. The fields of these motors are indicated at 47' and 51' in Figure 4. These two impressor motors may therefore serve to give the horizon ring 17 a motion in either of two directions at right angles to each other or any combination of such motions. Thus, if a disturbing force should, as in a manner later to be described, produce such a precession of the gyros as to tend to cause the displacement of the horizon ring 17 from its normal plane, force properly applied by these motors may be utilized to retain the ring 17 in the horizontal plane. This, it may be said is an important feature of this system, that is, by means of automatically or manually operated means, as the motors 47 and 51, the horizon ring 17 may be maintained in a horizontal plane regardless of large disturbing forces tending to displace it, so that this ring may serve as a means for indicating angular movements with reference to the horizontal plane of the ship. These angular movements are usually known as the pitch and roll of the vessel.

An arm 52, carried by the outer gimbal ring 14, immediately above one of the bearings 13 thereof, supports a concave mirror 53, known as the sighting mirror, which has a function hereinafter to be described.

At the other end of the table 6 and on the same side thereof as the sighting mirror 53, a vertical post 54 supports at its upper end a sighting telescope 55. To one side of this post and facing the mirror 53 there is also adjustably secured a graduated reference arc or scale 56 known as the sighting scale. This scale, as shown in Figure 7, is provided with a center line 57 known as the zero line, on opposite sides of which, and adjacent to one edge of the arc, are provided graduations 58. To further assist the eye in making use of the scale, color indications 60 and 61 are provided on each side of the zero line 57, which color indications we have shown in the drawings as being respectively yellow and blue. At the opposite side to the scale from that on which the graduations are disposed, and adjacent the zero line, there is provided checker markings 62 which serve as a further guide to the eye in indicating the approach of the zero line. The sighting mirror 53, the telescope 55 and the sighting scale 56 are so disposed with relation to each other that an observer sighting through the telescope at the mirror will see a reflection of the scale therein. Consider the table so moved as to have the line of sight from the telescope to the mirror in line with that from the telescope to the target on which the guns are being directed. Then with automatic means or with manually operated means such, for example, as herein described (motors 47 and 51) for maintaining the horizon ring 17 in a horizontal plane despite large disturbing forces, the telescope, mirror and sighting scale are so adjusted with relation to each other that at the instant the guns are in their firing position the observer, sighting through the telescope at the mirror, will just perceive the zero line 57 of the scale bisected by the cross hair of the telescope. (It is to be noted that by an adjustment of the scale the zero line 57 can be so disposed that the firing position of the guns may be placed at a point beyond the normal possible elevation angle of the guns themselves, in which case the roll or pitch of the ship performs a useful function.)

Carried in the top of the table 6 and adjacent the gyro apparatus previously described is a compass repeater 63, which is controlled from a gyroscope master compass, such as is usually carried aboard vessels, by means of the cable 63' lead through the base of the pillar.

This compass repeater consists of the usual compass card 64, the North point of which is always directed toward the North, an inner graduated scale 65 which is provided with a lubber line and is attached to the pedestal 11 so that it moves with the ship, and an outer graduated scale 66 secured to the table 6 and movable therewith. This compass repeater 63 has the following functions;—first, it shows the relation of the line of sight to the bow of the ship; second, it serves to show whether the ship is departing from a straight course, and how fast; and third, it serves to show in what direction the spot on the dial 40 has been displaced from the center of the dial.

Suitable counter-weights 67 are applied to various parts of the apparatus so as to adjust the centers of gravity, as well as to insure that the center of gravity of the whole system carried by the major gimbals 14 and 17 shall be directly and slightly below the center of motion of that gimbal system, and similarly that the center of gravity of each of the gyros 22 and 23 shall be directly and slightly below the center of motion of its gimbal system.

Referring now to Figure 1 of the drawings, the five wires of cable 68, carrying the current for two separate circuits 70 and 71, are connected each to a terminal on a common binding post or pillar 11. These terminals consist of bolts 69, passing through the pillar and insulated therefrom, as shown in Figure 6 and leads, on the inside of the pillar, furnish electrical connection between bolts 69 and bolts 69', connecting each to a contact ring 72, secured to the outside of the pillar and insulated therefrom as shown in Figure 4. A downwardly depending arm 73 secured to the under side of the table, is provided with spring contact fingers 74 adapted each to slide over and make contact with a corresponding contact ring of the series 72. A cable 75 leads from these contact fingers 74 and branches off into two separate cables 76 and 77. The cable 76 carries the two wires for the circuit 70 for the small electric light 43, the circuit passing thereto by way of the knife switch 78. The cable 77 carries the three wires of the three-phase circuit 71 which is utilized to operate the two impressor motors and the two gyro motors. The wiring, which is for the major part omitted in the drawings of the apparatus for the sake of clearness, but which is diagrammatically disclosed in Figure 4 of the drawings, is led to the various motors by way of the bearing points of the various gimbal rings and is so balanced and applied as to exert no disturbing influence on the gimbal systems, no matter what the position of the various parts.

Referring to the wiring diagram in Figure 4, it will be seen that the cable 77 carries the three wires $x$, $y$ and $z$ of the circuit 71 by which means the three phase current is supplied to the gyroscopes 22, 23 and the impressor motors 47, 51. The gyroscopes are connected in parallel and have the same electrical and mechanical properties and run at essentially the same speed, but, as before stated, these gyros are so wound and connected as to run in opposite directions. That is, looking down upon the gyros, the upper gyro 22 rotates in a counter clockwise direction while the lower gyro 23 rotates in a clockwise direction.

The three phase current from circuit 71 carried by means of the wires X, Y and Z, is also supplied to the fields 47', 51' of the two impressor motors. These motors are two phase motors operated from three phase current on the split phase system. Two independent windings, A and B, are provided for the second phase, so connected that when current passes through winding A, the torque on the motors is in the opposite direction to that obtained when the current passes through B. This arrangement of the circuits is clearly shown in Figure 4. The impressor motors 47 and 51 are used to apply torques to the two outer rings 14 and 17 of the major gimbal system. The circuits through the fields 47' and 51' of the motors are controlled by the so-called eight-point switch 80, shown in Figures 10, 11 and 12, which switch is structurally composed of two parts, forming really two separate switches designated 81 and 82 and shown separated in the wiring diagram for clearness.

Referring to Figures 10, 11 and 12, an upright lever arm 83 for operating the switch 80, having a ball handle 84 at its upper end, is supported at its lower end in the V-shaped bracket 85. A supporting washer 86 secured to an insulating member 87, which surrounds the lever 83 and is fastened thereto, carries upright rods 88, secured at their upper ends to the annular contact member 89, an insulating member 90 being secured to the top of the member 89. These members 89 and 90 are both provided with central openings 91 and are so supported by the rods 88 as to surround the lever 83 and normally be separated therefrom. A contact member 92 is carried by lever 83 adjacent members 89 and 90 and is adapted to contact with the walls of the opening 91 to close a circuit through contact member 89 when the lever is moved to an extreme position. A lead 93 has electrical connection with the bracket 85, providing a means for including the contact member 92 in a circuit which is closed by contact of member 92 with member 89, a lead 94 having electrical connection with the supporting washer 86, providing the means for including contact member 89 in the same circuit. Members 89 and 92 thus form the two contacts of the inner switch 82.

A second contact member 95, of octagonal configuration, is secured to insulating member 90 at the underneath side thereof and adjacent the annular contact member 89 but separated therefrom by air gap 96. A lead 97 has electrical connection with said member 95 whereby it is included in an electrical circuit.

The bracket 85 is secured to an annular insulating support 98 carried on table 6 and disposed around an opening 100 therein, by which means the bracket 85 is supported in a position beneath the table. As shown in Figure 12, the four contact arcs A, A', B, B', separated from each other, are secured to the annular insulating support 98. These contact arcs are of L-shaped cross section and are adapted to coact with the octagonal contact member 95 to close the outer switch 82 on movement of the lever 83 to an extreme position. The four arcs, A, A', B, B' are each connected by means of the leads $a$, $a'$, $b$, $b'$, to the circuits leading to the fields 47' and 51' of the impressor motors and according to the direction of movement of the lever 83, the octagonal contact member 95, may be caused to contact with either two of the arcs A, A', B, B' or only one of them, as may be desired, to operate either one or both of the impressor motors.

Thus the arcs and the octagonal contact member 95 form the two contacts of the outer switch 82 and this switch and the inner switch 80, are mounted concentrically and are operated by the same movement of arm 83.

To apply a torque through the motor 51 to the outer ring 14 in the sense determined by a current through the B winding, the top of the vertical lever 83 of the switch is pushed toward the B segment of switch 81 bringing 95 in contact with the B segment. This closes the circuit from X to B. By the same motion the contact 92 of the switch 82 is brought in contact with 91, closing the Z circuit. The motor 51 will now apply a torque in the direction specified until the pressure on the lever 83 is removed, when the lever flies back to its neutral position opening both circuits.

A torque on the impressor motor 51 in the opposite sense is obtained by moving the lever 83 in the opposite direction, that is, by bringing 95 in contact with Segment A, switch 82 being automatically closed by displacing the spring lever in any direction until it strikes the contact. Similarly the impressor motor 47 may be made to apply a torque in either direction to the horizon ring 17 while moving the spring lever 83 of the switch until 95 comes in contact with B, or A, as desired. Furthermore, both motors may be made to apply torques simultaneously by deflecting the lever 83 so as to bring 95 in contact at the same time with two adjacent arcs of 81, such as B and B1, the octagonal section of 95 adapting it to this purpose. Finally the magnitude of the torque applied may be adjusted at will by varying the external resistance R.

If preferred, it is understood that a dry cell mounted beneath the table 6 may be used to furnish the current to operate the electric light 43 instead of bringing this current in by way of contact rings 72 and spring contact fingers 74.

The operation of the device will now be understood by the following description.

Considering the apparatus mounted upon a ship, the guns are trained upon the target in such a manner that when the ship is in the firing position, the projectile should hit on the target. The proper elevation and train to apply to the gun is obtained by means of outside observations and the purpose of the apparatus here in question is to indicate to an officer controlling the firing circuit when with the gun properly adjusted as to range and azimuth, the ship is in firing position.

The table 6 on which the apparatus is mounted is first moved around the pedestal 11 by means of hand wheel 10, worm 7 and gear 8, so that the line of sight of the sighting telescope 55 as directed on the sighting mirror 53 is in line with the actual line of sight from the telescope to the target. Then, as regards angular movements of the ship in the vertical plane including the line of sight to the target, or components in this plane of any movement of the ship, the outer gimbal 14 remains unaffected and continues, so far as these movements are concerned, in a horizontal plane. As the horizon ring 17 is kept horizontal despite any disturbing forces tending to throw it out of horizontal plane, that diameter of the outer ring which is parallel to the line joining the telescope and mirror provides a reference line which is necessarily horizontal, and the mirror is therefore free to give a true indication of the relative movement between such reference line and the table or support 6, which carries the telescope and scale and which moves with the ship. The maintaining of the horizon ring 17 in a horizontal plane despite such disturbing forces is accomplished, when the disturbing forces are unusually large, with the assistance of the impressor motors 47 and 51 which are operated in accordance with the position of the spot on the dial 40. At other times such assistance is not needed.

As before stated, the sighting telescope 55, sighting mirror 53, and the scale 56 are adjusted to such relative positions that the zero line 57 on the scale will be on the cross hairs of the telescope when the diameter of the outer ring just referred to is horizontal and the guns of the ship are in firing position. The observer looking through telescope 55 sees angular motion which is in general a mixture of pitch and roll of the ship, and will observe the zero line 57 bisected by the cross hairs only at the time when the above condition is true, just as with a telescope looking at a real horizon.

At the instant when the zero line 57 is bisected by the cross hairs, the observer sighting through the telescope may close the firing circuit to fire the guns.

It is well known that the rate of precession of a gyroscope is directly proportional to the applied torque and inversely proportional to the angular momentum of the gyroscope. The angular momentum of the gyroscope is equal to the product of the moment of inertia into the angular velocity. The moment of inertia is in turn equal to the product of the mass of the gyroscope multiplied by the square of its radius of gyration. Consequently increasing the mass of the gyroscope or its radius of gyration or its angular volocity will increase its angular momentum and so decrease its rate of precession in response to any given applied torque.

In the case of a gyroscope weighing about 5000 grams rotating at a speed of 10,500 R. P. M., the precession produced by an applied torque of 10 cm grams would take place at the rate of 0.6 min. of arc per second of time. If the spin axis of the gyroscope were originally vertical, the axis would depart from the vertical at this rate and at the end of ten seconds the spin axis would subtend an angle of six minutes with the vertical. In other words, the precession starts the moment the torque is applied and continues at a uniform rate so long as the torque remains uniform In the two-gyroscope arrangement herein described, each gyroscope precesses at a rate proportional to the external applied torque, as in the case of a simple gyroscope. The two gyroscopes do not, however, displace the horizon ring during the earlier stages of this precession, the ring retaining its horizontal position. In fact no disturbance of the ring occurs until the gyroscopes have departed from the vertical to such an extent that a secondary precession of the gyroscopes is produced, due to the torques resulting from their individual gravitational righting moments. These torques are such as to cause the upper ends of the spin axes of the two gyroscopes to move in the same direction. The axes are constrained by the connector from moving in the same direction and hence in their precession they carry the horizon ring with them.

If the two gyroscopes were neutral, i. e., if the center of gravity in each instance was located at the point of intersection of the two supporting axes, then this secondary precession would not occur. Such an arrangement would, however, tend to hold the horizon ring parallel to a fixed plane in space, which would defeat the purpose of this apparatus, which has for its object the maintenance of a horizontal plane. It is obvious that such a horizontal plane changing its angular relation to a fixed plane in space at a rate dependent upon the angular velocity of the earth and the latitude of the place. In fact, advantage is taken of this secondary precession in order to make the zenith line established by the instrument follow the true zenith. The two gyroscopes automatically incline their axes to the vertical at such an angle that the secondary precession resulting from the gravitational righting moments thereby introduced is at a rate such as to make the indicated zenith coincide with the true zenith.

The effect of friction is ignored in the above discussion. Frictional effects may be considered as torques about the axis in which the friction occurs. Frictional torques are in general small in comparison with the other forces under consideration.

The disturbances to the apparatus and especially to the horizon ring 17 may be placed in two classes, one class due to the angular motions of the ship, that is, due to the pitch and roll, and the other class due to the accelerations to which the ship is subjected. Such accelerations are in the fore and aft direction if due to the change of speed of the ship or they are in the abeam direction when they are due to a motion of the ship in a curved path, as, for example, during a turn or during a yawing motion.

Let the two classes of disturbances due to angular motion and to accelerations be considered separately.

It will be noted that the horizon ring 17 and all of the inner portion of the apparatus carried by it is protected from the effects of angular motion of the ship by the two sets of ball bearings of the major gimbal system 15, except for the very small effects of the friction in those ball bearings. In the actual operation of the apparatus this protection is very nearly complete.

When the ship, and, therefore, this apparatus, is subjected to an acceleraton in a given direction, as the center of gravity of the whole apparatus is below the center of motion of the major gimbal system 15, the acceleration applies a torque to the whole apparatus tending to make its top move in the direction of the acceleration.

Assume that in a given case the acceleration is due north. The torque, due to the acceleration, will be transmitted through their gimbal systems and the connector 33 to each of the two gyros 22 and 23 and will tend to move the top of each gyro directly northward. Recalling now the fundamental principle of the gyro that an applied torque produces a precession at right angles to the direction of the torque, it will be noted that the top of the lower gyro 23 which rotates clockwise, will precess due eastward and the top of the upper gyro 22, rotating counterclockwise, will precess due westward. These two precessions being in opposite directions will not be opposed at the connector. The connector will move due east and there will be no motion of the horizon ring at first.

After the acceleration referred to has been in operation for some time and the connector has moved eastward, the action of gravity on each of the two gyros, their centers of gravity being below their centers of motion, will tend to restore each gyro to the vertical. This gravity torque on the lower gyro will be due westward and, therefore, will produce a precession due northward. Similarly, the gravity torque acting on the upper gyro will be due eastward and will produce a precession of the top of that gyro to the northward. The two precessions of the tops of the two gyros being both to the northward, as produced by the gravity torques, will be opposed at the connector 33 and as a result the gyros will carry the horizon ring 17 out of position so as to throw the top to the northward. Note that this motion of the horizon ring is slow, is considerably delayed with respect to the disturbing acceleration which produced it, and that it is in the direction of the acceleration, for the separate gyros respond but slowly to the accelerations and the horizon ring 17 is not disturbed until the gyros have been thrown out of their normal position.

If, now, the disturbing acceleration to the northward ceases to act, a similar analysis of the motions will show that the horizon ring will, after a delay, return by a direct path to its normal position. Thus by means of the construction shown, an instrument is provided which will not respond very readily to disturbance tending to alter the natural state of the system but which will only be affected slowly and after a delay to follow up and alter its state due to such disturbing forces. And when the disturbance ceases the force of gravity will slowly act to restore the system to its normal position with the inner ring of the outer system horizontal.

For the sake of clearness in statement the acceleration used in this illustration was assumed to be due northward. A similar slow and delayed response to an acceleration in any direction will occur and will be followed by a similar return to the normal horizontal position.

In tracing these forces and their effect, comparison of the present system with that including only a single gyroscope would best bring out certain points.

Considering now that in place of the two gyroscopes 22 and 23, mounted as herein disclosed in the outer gimbal rings 14 and 17, there is substituted a single gyro mounted in the horizon ring 17 of the major gimbal system 15 and having its center of gravity slightly below its center of motion.

When such gyro is subjected to accelerations such as is caused by a change of the speed of the ship, turns, or changes in direction of the vessel, as produced by yawing, etc., this would have the effect of displacing the gyro from its normal plane of rotation to a more or less extent, depending upon certain factors which need not be fully explained here. However, it may be stated that with such a single gyro system, when a torque is applied to the gyro, the axis responds by a precession at right angles to the torque, and such a torque will be in action whenever and as long as the single gyro instrument now being considered is subjected to a horizontal acceleration. Then, when the disturbing torque ceases to act, the gyro returns to its normal position by its axis moving on a long spiral path. The time of return of the gyro to its normal position following the path above described is much longer than that during which the disturbing torque acts, and during certain parts of this time the outer gimbal ring of the system would be caused to move by the gyro so as to displace it from a horizontal plane, thus displacing the mirror carried by it and producing an error in the indicated horizon. The single gyro system furnishes in itself no indication of the rate at which such errors are being accumulated.

In marked contrast to the single gyro system, with the double gyro system disclosed in this application, the system as a whole, being composed of the two gyros 22 and 23 and their gimbals hung in the inner ring 17 of the major gimbal system 15, the horizon ring 17 responds to a disturbing torque in the direction of the torque with a delayed action at first and slowly thereafter. Then, when the disturbing torque ceases to act, the relation between the two gyros is such that in a manner which may be traced from preceding remarks, the system returns to its normal position in a direct path (and not in a spiral path as in a single gyro) in a time about equal to that in which the disturbing torque was acting.

As before stated, when accelerations affect this double gyro system to displace the gyros from their normal plane of rotation, such movement will at first produce a movement of the gyros themselves without a corresponding movement of the rings 14 and 17 of the major gimbal system. Concave mirror 44 moves with the gyro 22 and displaces the spot on the dial 40, the dial at first remaining stationary as does the horizon ring 17 which supports it. During the first stages of the operation in acceleration, referred to above, each gyro responds by precession at right angles to the acceleration. The spot on the dial 40 produced by reflection from mirror 44 mounted on the upper gyro will therefore move at right angles to the disturbing acceleration. As the dial 40 is graduated in degrees around the circumference as at 41 and provided with circles of reference 42, reference to the compass repeater 63 mounted adjacent the gyro system will show from what direction the acceleration is coming which has produced this displacement of the image of the light. As the rate of precession of the gyros is proportional to the torque, the movement of the image of the light on the dial 40 therefore furnishes a continuous indication of the direction and rate at which the system is being affected. Thereupon the circuit controlling switch 80 is brought into play to actuate either one or the other or both of the impressor motors 47 and 51 to retain the gimbal rings 14 and 17 in their proper positions and correct for the disturbing influence of this acceleration. In this manner the image of the light is caused to journey back over a straight course to its proper position on the dial.

It may thus be seen that by this arrangement it is possible to supply external power to the gimbal rings 14 and 17 of the major gimbal system 15 to retain them in to their proper positions should they tend to be displaced by reason of certain unusually large accelerations acting on the gyro system, so that by this means the sighting mirror 53 reflecting the scale 66 is for all practical purposes held stationary. On the other hand, the spot and dial system is not possible with the single gyro system as both would have to be attached to the inner gimbal ring in that case and there would be no relative movement between the spot and dial.

It is then the duty of one operator by means of the circuit controlling switch 80 to constantly maintain a reflection of the light 43 on the desired position on the dial 40 within certain limitations. Certain small wanderings of the image of the light from the desired point, representing only small disturbances, do not affect the system so much as to require the application of corrective forces through the impressor motors and may be overlooked. If at any time this indication shows that the horizon ring 17 is responding to any disturbances so rapidly as to accumulate an error which is larger than is allowable, the manual control through the circuit controlling switch 80 may be used to apply the proper torque to the horizon ring to cause the spot on the target to move back to its normal position and, therefore, to indicate, what will then be the fact, that the horizon ring has stopped in its motion.

In the normal operation of the apparatus on the ship, it is intended that this manual control shall be used only during rapid turns of the ship or quick changes of speed and occasionally during unusually severe yawing. On other occasions the horizon ring will, without such manual control, maintain its position within the allowable limits.

The operator observing through the telescope 55 the reflection of the scale 56 in the mirror 53 attached to the outer gimbal ring 14 of the major gimbal system 15 has then only to close the switch in the firing circuit at the time when the zero line 57 and the cross hair of the telescope coincide.

One factor will now be considered which enters into consideration with this device and which has heretofore been omitted in order that a clear understanding of the invention might first be had. The apparatus and the ship which carries it are on a rotating earth, hence if the horizon ring is to indicate the true horizon at all times the horizon ring must itself be rotating in space at the same rate as the earth. However, inertia tends to retain the system in its original state, and a gravity torque is then brought into play and a complicated situation is brought about because of which two gyros each have a precession due eastward and at a rate equal to the rate of rotation of the earth. An analysis of the apparatus will show that when no disturbing accelerations are in action and the above condition of eastward precession has been attained the top of the upper gyro will be slightly inclined to the northward and the lower gyro to the southward with reference to the positions in which they would hang if the gyros were not running. With these slight inclinations gravity acting on each gyro furnishes a torque which produces the slow precession to eastward. The normal position of the spot on the dial when no disturbances are in operation is therefore always due north of the position which it would have were the gyros not running. Hence, it is necessary to take account of this fact on board the ship by knowing the direction of the true north on the compass repeater 63 and carrying that direction up to the dial, which is made to correspond with the graduations on the outer scale 66 against which the compass repeater is read.

While a manually operated means has heretofore been described for applying torque to the gimbal rings 14 and 17 of the major gimbal system 15, it must be understood as within the provisions of this invention to apply automatically such corrective torques to the system as are described above as applied manually through the medium of the impressor motors. Thus, for example, the following plan may be used: The corrective torques may be applied directly by moving weights carried in the system and shifted by the accelerations to which the system is subjected, or by moving masses of liquid serving the same purpose.

One form of device for applying such corrective torques as are referred to in the preceding paragraph will be designated as a weight shifter and will now be described.

The weight shifter designated generally as 102 is secured to the horizon ring 17, as shown in Figures 13 and 14. It consists essentially of four parts; (a) four balls, (b) four tracks upon which the four balls roll, (c) four backstops which limit the travel of the four balls in certain directions and (d) a rigid casting which serves to maintain the four tracks and four backstops in relative positions which are fixed with respect to each other and as a whole with respect to the horizon ring 17.

The rigid casting 103 consists of a cross-shaped structure forming four troughs 104, which extend in four directions at angles of 90° from each other. Three lugs 105 on the casting provide means for securing the casting to the horizon ring 17, one of these lugs being carried by a flange 106 which connects the outer ends of two adjacent troughs. This flange 106 is compensated for in the construction of the casting so that it does not disturb the balance thereof and is merely provided that the three lugs 105 are in a most advantageous relation to each other for the leveling of the casting. By means of leveling bolts 107, cooperating with the lugs 105 for securing the casting to the horizon ring 17, the casting may be adjusted so as to make the plane which coincides with the bottom of all four troughs parallel to the plane of the horizon ring 17 and may be rigidly clamped in that relation to the horizon ring. The casting is further provided with a central bore or opening 108 of such diameter that the connector 33, which is surrounded by the walls of the bore is free to accommodate itself to the various movements which it undergoes in the operation of the device.

Each track consists of two cylindrical steel rods, 109, each of which is rigidly clamped at the outer end in a block 110 which is secured to the bottom of the trough at its outer end. At the inner end the rods are supported in blocks 111 and rest in suitable seats therein. The dimensions of the inner and outer blocks and the angles at which the rods are held in the outer blocks 110 are so fixed that when the parts are assembled (1) each rod is an inverted cantilever which is under a bending moment at the point of emergence from the outer block and is subjected to an upward force at the inner block, and is therefore concave upward at all points, (2) each rod slopes downwardly and inwardly at its point of emergence from the outer block 110 with reference to the plane which coincides with the floor of all the troughs, (3) each rod is parallel to said plane at some intermediate point on its length, (4) each rod slopes upwardly and inwardly with reference to said plane at parts of the rod near the inner block, and (5) the two rods of any track are parallel to each other at corresponding points.

The actual curvature of the rods 109 is very small, so in the drawing, for the sake of clearness, this curvature has been exaggerated. The parallel point referred to under (3) in the last paragraph has been indicated by the letter "x."

The blocks 110 as shown in Figure 16 are provided with a recess 112 which serves to make the apparatus more compact for a given total travel of the balls by providing an opportunity for a ball to roll into the outer block to the greatest distance possible without interference with the necessary features of construction.

The balls 113, which move freely on the four tracks between certain fixed limits, are spherical steel balls such as are ordinarily used in ball bearings.

The backstops 114 are each a metal stud screwed to the floor of the trough in such a position as to stop a ball in its movement towards the inner end of its track a short distance before it reaches the point at which the track is parallel to the floor of the trough. When a ball is against its backstop the part of the track on which it rests has a slope which is very slightly downward and inward with respect to the floor of the trough.

The outer limit of movement of the ball is reached when it comes in contact with the walls of the recesses 112 in the outer block 110.

Each track is provided with a cover 115 of celluloid or the like.

The weight shifter described above being substituted for the impressor motors 47 and 51 together with their accessories will operate as described below and apply desirable corrective torques when such corrective torques are needed.

The weight shifter having been so attached rigidly to the horizon ring 17, in a manner already described, that the plane which includes the floor of all four troughs is parallel to the plane of the horizon ring, let it be assumed that the whole apparatus of which the weight shifter is now a part is subjected to a considerable horizontal acceleration such, for example, as would occur when the ship carrying the apparatus is turning at full speed. Suppose that the acceleration is due north and that one of the four tracks 109 of the weight shifter has its outer end directly due south.

The center of gravity of the whole apparatus being below the center of motion of the major gimbal system 15, the acceleration applies a torque to the whole apparatus tending to make its top move in the direction of the acceleration namely, due north. This torque we will call the "direct" torque.

That one of the four balls which is on the track leaving its outer end directed due south will roll away from its backstop toward the outer end of the track, being left behind, so to speak, when the acceleration to the northward carries the track to the northward. After it has rolled to the new position its weight, as it rests upon the track, applies a corrective torque, proportional to the weight and to the linear horizontal displacement of the ball from its former position against the backstop, which "corrective" torque tends to make the top of the apparatus move due south, that is, directly opposite to the direction of the acceleration.

The net torque then in operation upon the apparatus as a whole is the difference between the "direct" torque and the "corrective" torque, due to the displacement of a ball away from its backstop.

The "direct" torque is proportional to the acceleration and to the product of the weight carried on the major gimbal system 15 times the distance from the center of gravity of said weight to the center of motion of said gimbal system.

The "corrective" torque is proportional to the distance which the ball is displaced from the backstop and to the weight of the ball. The ball, will, under a given acceleration of the apparatus as a whole, roll away from the backstop until it reaches a point on the track at which said track is perpendicular to the resultant of gravity and the acceleration. At that point the ball will remain, for the reaction of the track against the ball at that point being necessarily perpendicular to the track, friction being neglected, will be the equal and opposite of the resultant due to both acceleration and gravity and the ball will be in equilibrium with respect to the track. Any short portion of the track has a radius of curvature which is nearly constant, and therefore the change in slope of the track between the backstop position and any other position is nearly proportionate to the linear distance between the positions. For all such accelerations as are here under consideration, the resultant of acceleration combined with gravity differs from the direction of gravity by an angle which is nearly proportionate to the acceleration. It follows from the statements of the two sentences which immediately precede this one that the displacement of a ball from its backstop is nearly proportional to the acceleration which causes said displacement. This when combined with the first sentence of this paragraph shows that the corrective torque is nearly proportional to the acceleration which produced it.

By proper design of the various parts concerned it is therefore possible to make the "corrective torque" produced by any acceleration (which corrective torque is nearly proportional to said acceleration) approximately equal for all large acceleration to the "direct" torque (which is also nearly proportional to said acceleration) and therefore to make the net torque (the difference between "direct" torque and "corrective" torque) very small for all large accelerations.

In the assumed case now under consideration the net torque produced by the northward acceleration being very small, the precessions of the separate gyros to eastward and westward produced by it will be very slow, the consequent movement of the connector will be very slow, and the disturbance of the horizon ring produced by the acceleration will be much delayed and exceedingly small.

For the sake of clearness in statement the acceleration used in this illustration was assumed to be northward. A similar action will result from an acceleration in any other direction.

So also, for the sake of clearness one of the four tracks of the weight shifter was assumed to have its outer end extending in a direction exactly opposite to the direction of acceleration. In that case only one of the four balls will move away from its backstop. With reference to two of the other balls the acceleration is neutral in effect being at right angles to the tracks on which these balls move. The acceleration tends to make the fourth ball press harder against its backstop than before.

In the general case, no track will point exactly opposite the direction of acceleration and two of the four balls will roll away from their backstops if the acceleration is sufficiently large. An analysis of the problem shows that the distances to which the two balls will be displaced and the "corrective" (torques) separately introduced by the two balls are such that the resultant "corrective" torque produced by the two together is a close approximation in direction and amount to the "corrective" torque which would be produced by a single ball on one track if that track happened to extend in a direction opposite to the acceleration as first assumed above.

In the general case, regardless of the particular direction of any considerable acceleration or of the relation of the direction of the tracks to the direction of acceleration, the action of the weight shifter is to apply automatically and promptly a "corrective" torque nearly equal to the direct torque produced by the acceleration and hence to make the net torque so small that there is but very small and slow response of the apparatus to the disturbing accelerations.

After the large disturbing accelerations have ceased to act, the displaced balls will roll back against their backstops unless the total displacement of the horizon ring 17 from the normal position exceeds a certain amount, and the horizon ring will return, after a delay, by a direct path to its normal position.

The maximum referred to is fixed by the small downward and inward slope, with respect to the floor of the trough, which the track has at the point upon which the ball rests when it is in contact with its backstop. If the horizon ring has been displaced from its normal position by more than said slope then when the disturbing acceleration ceases to act the displaced ball or balls will move back toward, but not to, their backstops. The slope in question is made somewhat larger than the greatest departure of the horizon ring 17 from its normal position that is expected to frequently occur. Also the relation of "corrective" torque to direct torque is for a considerable range of disturbing acceleration, from zero up, such that the net torque will always be in the same direction as the direct torque. This range is to be made large enough to include the acceleration corresponding to the maximum displacement of the horizon ring 17 which will ever occur. This being done, if after any very large and long continued disturbance the displaced balls do not return completely to their backstops at once they will then be applying a "corrective" torque which simply delays but does not prevent the return of the horizon ring 17 to its normal position.

Whenever all four balls are against their backstops no corrective torques are produced by them. This condition will occur whenever the horizon ring 17 is near its normal truly horizontal position and the acceleration is either zero or very small.

In the foregoing description the tracks are stated to be made of cylindrical steel rods elastically distorted to a cantilever curve. This construction was selected as a convenient means for furnishing the necessary accuracy in duplicating the curvature of the four tracks required for the particular application of the invention for use on battleships. For other applications, especially those involving larger accelerations, the track may most conveniently be built in other ways. This invention is to be understood as contemplating the use of a rolling ball on tracks which are curved in profile, are concave upward, and are carried by the horizon ring or means associated therewith.

It is, of course, obvious that this invention is susceptible of various modifications and changes which fall within the spirit of the same without departing from the scope of the following claims, it being understood that the present disclosure is by way of illustration only and is not to be taken to be restrictive of our conception.

What we claim is:—

1. Gyroscopic apparatus comprising, in combination, a support subjected to disturbing movements and forces, a gyroscopic system supported by said support and maintaining a constant horizontal reference line despite said movements and forces, and means for indicating the relative positions of said support and said line.

2. Gyroscopic apparatus comprising, in combination, a rotatable support subjected to disturbing movements and forces, a gyroscopic system supported by said support and maintaining a constant horizontal reference plane despite said movements and forces, and means for constantly indicating the angular relation between said support and said plane, said system including a major gimbal unit supported by said support.

3. Gyroscopic apparatus comprising, in combination, a support subjected to disturbing movements and forces, a gyroscopic system carried by said support and constantly maintaining a horizontal reference line in one position despite said movements and forces, and means for constantly indicating the relative positions of said support and said line, said system including a plurality of gyros having axial connections.

4. Gyroscopic apparatus comprising, in combination, a support subjected to disturbing movements and forces, a gyroscopic system carried by said support and constantly maintaining a reference plane in a horizontal position despite said movements and forces, and means for constantly indicating the relative positions of said support and said plane, said system including two oppositely rotating gyros with vertically disposed axes having a connection between their axes.

5. Gyroscopic apparatus comprising, in combination, a support subjected to disturbing movements and forces, a gyroscopic system carried by said support and constantly maintaining a reference line in one position despite said movements and forces, means for constantly indicating the relative positions of said support and said line, said system including a pair of gyros mounted adjacent each other with a ball and cylinder connection between their axes.

6. Gyroscopic apparatus comprising, in combination, a rotatable support subjected to disturbing movements and forces, a gyroscopic system supported by said support and maintaining a constant reference line despite said movements and forces, and means for constantly indicating the angular relation between said support and said line, said last named means including a telescope and sighting scale by said support and a mirror carried by said system.

7. Gyroscopic apparatus comprising, in combination, a support subjected to disturbing movements and forces, a gyroscopic system supported by said support and maintaining a constant reference line despite said movements and forces, said system including a major gimbal unit and two gyros supported in said unit with two of their axes connected, and means for indicating at all times the angular relation between said support and said line.

8. Gyroscopic apparatus comprising, in combination, a rotatable support subjected to disturbing movements and forces, a gyroscopic system supported by said support and maintaining a constant reference line despite said movements and forces and means for constantly indicating the angular relation between said support and said line, said last named means including a telescope and sighting scale carried by said support and a mirror controlled in position by said major gimbal unit.

9. Gyroscopic apparatus comprising, in combination, a rotatable support subjected to disturbing movements and forces, a gyroscopic system supported by said support and maintaining a constant reference line despite said movements and forces, and means for constantly indicating the angular relation between said support and said line, said last named means including a telescope and sighting scale carried by said support and a mirror carried by said system, and said sighting scale providing a zero line and distinctive color markings on opposite sides of said line..

10. Gyroscopic apparatus comprising, in combination, a support subjected to disturbing movements and forces, a gyroscopic system supported by said support and maintaining a constant reference line despite said movements and forces, and means for constantly indicating the relative positions of said support and said line, said system including a major gimbal unit and two gyros supported in said unit with two of their axes connected and normally positioned in a definite relation to each other, and means for maintaining said gyros in their normal relation despite the effect of said disturbing movements and forces.

11. Gyroscopic apparatus comprising, in combination, a support subjected to disturbing movements and forces, a major gimbal unit consisting of inner and outer members supported by said support, a gyroscopic combination, having vertical disposed connected axes carried by said inner member of said major gimbal unit in a normal position which is unaffected by said movements, and means for indicating the disturbing of the position of said gyroscopic combination in said inner member due to said forces.

12. Gyroscopic apparatus comprising, in combination, a support subjected to disturbing movements and forces, a major gimbal unit consisting of inner and outer members supported by said unit, gyroscopic means carried by said support and providing a reference line constantly maintained in one position despite said movements, a plurality of tracks and a series of balls carried on said tracks and shifted in position on action of said forces for maintaining said reference line in position despite said forces.

13. Gyroscopic apparatus comprising, in combination, a support subjected to disturbing movements and forces, a major gimbal unit consisting of inner and outer members supported by said support, gyroscopic means carried by said support and providing a reference line constantly maintained in one position despite said movements, said last named means including a cross-shaped member provided with tracks and weights movable on said tracks within regulated limits.

14. Gyroscopic apparatus comprising, in combination, a support subjected to disturbing movements and forces, a gyroscopic system supported by said support and maintaining a constant reference line despite said movements and forces, and means for constantly indicating the relative positions of said support and said line, said gyroscopic system including a major gimbal unit and a plurality of connected gyros with their axes normally disposed with a definite relation to each other, and means for indicating a change in the position of said axes due to said forces.

15. Gyroscopic apparatus comprising, in combination, a support subjected to disturbing movements and forces, a major gimbal unit supported by said support, and a pair of oppositely rotating gyros carried one over the other in said major gimbal unit with vertically disposed connected axes, the center of gravity of each gyro and its gimbal system being slightly below the center of motion of that system and the center of gravity of the whole system being slightly below the center of motion of the major gimbal system, whereby to provide means for maintaining a constant reference line despite said movements and forces.

16. Gyroscopic apparatus comprising, in combination, a support subjected to disturbing movements and forces, a major gimbal unit supported by said support, and a pair of oppositely rotating gyros carried one over the other in said major gimbal unit with vertically disposed connected axes, the center of gravity of each gyro and its gimbal system being slightly below the center of motion of that system, and the center of gravity of the whole system being slightly below the center of motion of the major gimbal system, providing means for maintaining a reference line in constant position despite said movements and forces, and means for adjusting said centers of gravity.

Signed at Washington, Distict of Columbia, this third day of March, 1919.

JOHN FILLMORE HAYFORD.
LYMAN JAMES BRIGGS.